3,513,068
PROCESS FOR PULPING WOOD CHIPS WITH SODIUM SULFIDE AND ORGANIC SOLVENT
Laurence D. Starr and Ronald L. Casebier, Shelton, Wash., assignors to Rayonier Incorporated, New York, N.Y., a corporation of Delaware
Filed Jan. 13, 1967, Ser. No. 609,103
Int. Cl. D21c 3/20
U.S. Cl. 162—76     6 Claims

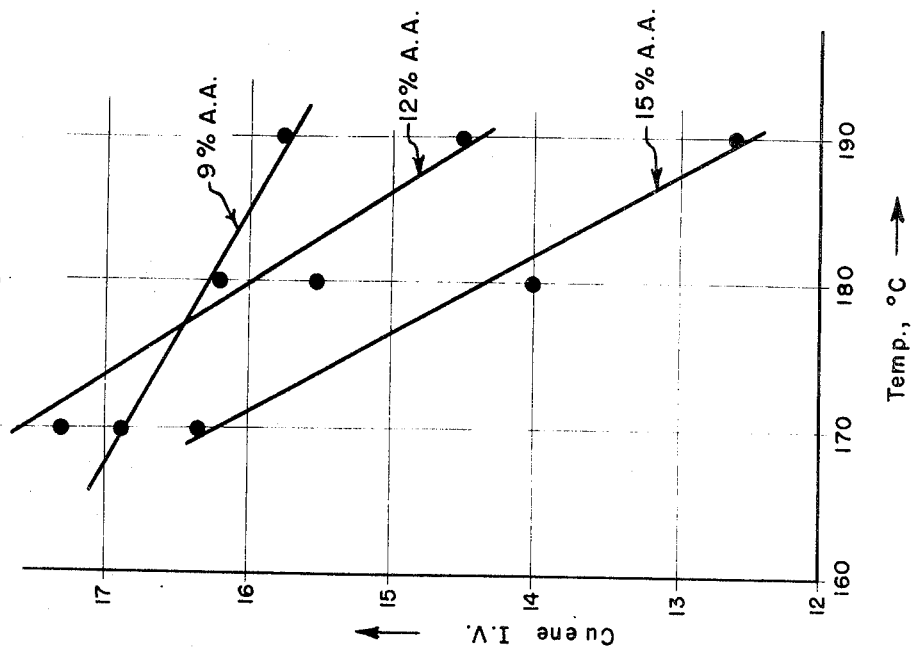
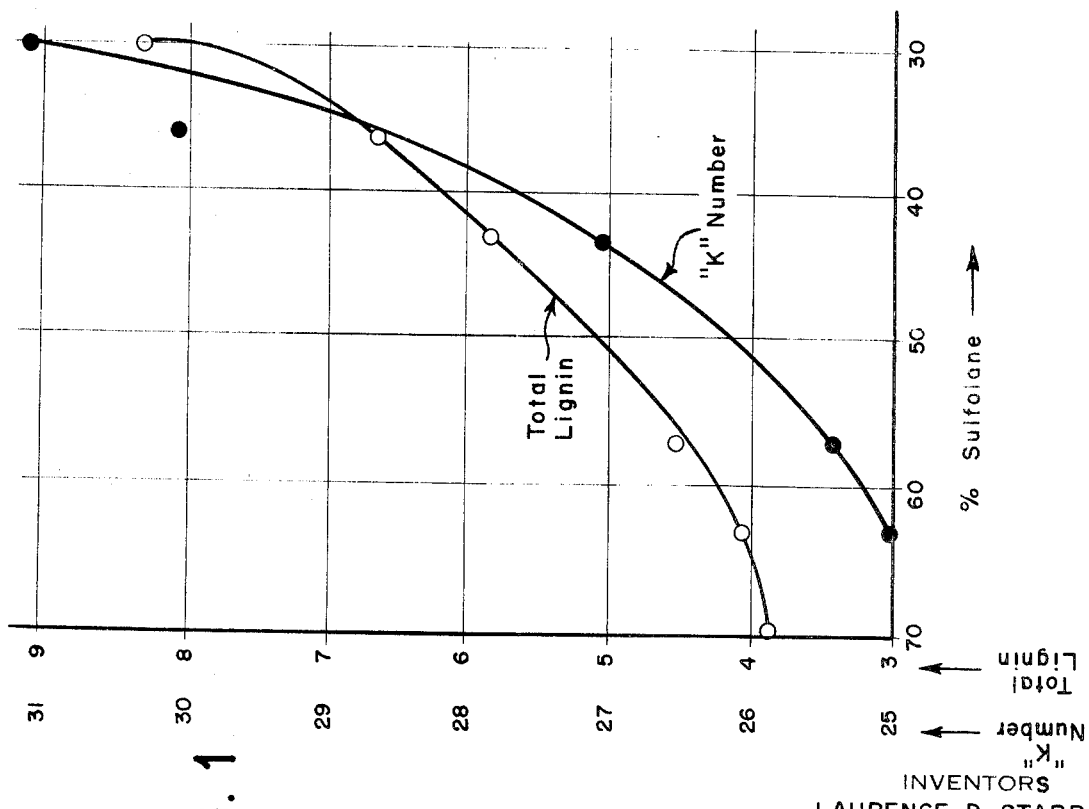

ABSTRACT OF THE DISCLOSURE

In the process of this invention wood chips are digested in a solution consisting essentially of an organic solvent for degraded lignin, preferably a sulfone, and 9 to 15% of active alkali added as sodium sulfide, providing essentially the entire active alkali in aqueous solution resulting in a pulp having eyceptionally high I.V. values in the range of about 12 to 18, and in yields as high as 60%.

---

The separation of lignin from wood by extraction with organic solvents in which lignin is soluble has been the subject of considerable research for many years but we are not aware of any organic solvent extraction process which has reached the level of commercial acceptance.

This invention is based on our discovery that wood chips digested in an aqueous alkaline solution of sodium sulfide and an organic solvent for degraded lignin give pulp having unexpected high I.V. values and high pulp yields, and other important results. In accordance with our invention we employ the combination of a relatively mild 100% sulfidity pulping solution which means that the solution is substantially free of added sodium hydroxide the active alkali being provided with sodium sulfide and an organic solvent for degraded lignin such as a sulfone.

Suitable organic lignin solvents for use in this invention include alkyl polyols such as ethylene glycol and the cyclic or acyclic sulfones. Successful digestions have been run in the laboratory using ethylene glycol, sulfolane, dimethyl sulfone, di-n-propyl sulfone, di-n-butyl sulfone and 3-methyl sulfolane with the sulfolane so far giving the best over-all results.

The organic solvent appears to dissolve and remove degraded lignin while the mild sodium sulfide solution does not appreciably degrade the carbohydrate portions of the wood such as results with strong caustic solutions. In addition, the presence of the lign solvent appears to help prevent reprecipitation of dissolved lignin onto the carbohydrate or combination therewith during the cooking process. In any event, a useful form of lignin appears to be obtainable as a by-product from the spent liquor. Recovery of the solvent solution from the spent liquor also appears feasible in commercial operations. A typical combination solution comprises an approximately one to one aqueous solution of the organic solvent containing from 9 to 15% of active alkali added as sodium sulfide and expressed as $Na_2O$. A practical digestion solution to wood chip ratio is 5:1 and the digestion can be efficiently carried out at about 170° C. in less than three hours. The digestion of pulp in such solution results in a sharply increased cuene I.V., as high as 18 and increased yields as high as 60%, without any increased cooking time or temperature. The product chips leaving the cooking vessel will usually require mechanical disintegration by some means such as afforded by a Sprout-Waldron refiner and will have a relatively high K number, yet the chlorited pulp will completely dissolve in cuene.

Pulps produced by this method have several unique properties. These pulps are completely soluble in cuene after chloriting. Cuene viscosity, therefore, permits a good estimation of the true intrinsic viscosity. Intrinsic viscosities of these pulps in cuene are usually high and correspond roughly to a nitrate degree of polymerization (D.P.) of 2,500 to 2,900. These are exceptionally high for wood derived carbohydrates and are similar to chemical cottons which have relatively high molecular weights. This D.P. range is also not far removed from that of native cellulose, starting at 3,500.

Total hemicullulose content for these pulps has varied from 12.2 to 15.7%. Several possibilities arise from the apparent high D.P. of the pulps:

(1) The high cuene I.V. may indicate that the hemicelluloses present are also of an exceptionally high degree of polymerization.

(2) If the hemicelluloses present are similar in molecular weight to those found in conventional pulps, then the cellulose must be of exceptionally high degree of polymerization-greater than 2,900.

(3) Non-cellulosic artifacts present in the pulps may account for the high viscosity of the cuene-pulp solution.

The cooking procedure used in the following examples was as follows: wood chips, organic solvent, water and sodium sulfide ($Na_2S$) were placed in an 1150-ml. capacity stainless steel reactor in the proportions indicated. Sufficient wood chips to provide 150 grams of wood on an oven-dry basis, a total of 750 grams of organic solvent and water proportioned between the two as indicated, and sufficient $Na_2S$ to give the indicated active alkali content (A.A.) to the mixture were placed in the reactor. The reactor was then sealed, attached to a slowly rotating spindle and the contents heated to the desired temperature in, and for, the derived periods of time. The cooked wood chips were then cooled, removed from the reactor, drained on a screen, mechanically beaten briefly in two liters of 1% aqueous NaOH solution (to prevent reprecipitation of solubilized lignin and to break up the chips into fibers), centrifuged, washed an dried. The tests made on the pulp as indicated in the various examples and tables were run by standards TAPPI methods. With respect to the symbols used in the tables: "K Number" refers to a test for residual lignin shown by oxidation with potassium permanganate, "I.V." means intrinsic viscosity, $S_{10}$ is the amount of the pulp soluble in 10% NaOH solution at 20° C., and $S_{18}$ is the amount of pulp soluble when using 18% NaOH solution at 20° C., $S_{10}-S_{18}$ corresponds to the true beta cellulose content, and $R_{10}$ is the true alpha. Cuene refers to a standard cupriethylene diamine solution for dissolving cellulose commonly used in the pulping art which is $1.000\pm0.005$ M in copper with an Ene/Cu ratio of 2.00–2.03 to 1. Cuene I.V.'s are intrinsic viscosities calculated from the specific viscosity of a 0.5% solution of the chlorited cellulosic sample in a 1 to 1 mixure of said cuene and distilled water.

The following examples illustrate operations carried out according to the process of the invention:

EXAMPLE I

| | Bamboo | | | Gum | | | | | |
|---|---|---|---|---|---|---|---|---|---|
| Active alkali, percent [1] | 15 | 12 | 9 | 15 | 12 | 9 | 15 | 12 | 9 |
| Liquor to wood ratio, w./w. | 5:1 | 5:1 | 5:1 | 5:1 | 5:1 | 5:1 | 5:1 | 5:1 | 5:1 |
| Percent sulfolane | 50 | 50 | 50 | 50 | 50 | 50 | 50 | 50 | 50 |
| Time to, hours | 1.5 | 1.5 | 1.5 | 1.5 | 1.5 | 1.5 | 1.5 | 1.5 | 1.5 |
| Time at, hours | 2 | 2 | 2 | 1.5 | 1.5 | 1.5 | 1.5 | 1.5 | 1.5 |
| Temperature, °C | 170 | 170 | 170 | 170 | 170 | 170 | 160 | 160 | 160 |
| Yield, percent | 42.4 | 44.2 | 47.2 | 16.4 | 42.5 | 50.2 | 52.8 | 53.5 | 51.9 |
| Tailings, percent | Nil | Nil | Nil | Nil | Nil | Nil | 0.175 | 0.505 | 1.99 |
| "K" Number | 8.2 | 9.0 | 11.0 | 9.3 | 10.6 | 13.4 | 13.6 | 14.8 | 24.8 |
| I.V. | 12.43 | 13.80 | 14.13 | 11.85 | 13.3 | 14.6 | 11.85 | 13.60 | 13.80 |
| $S_{10}$ | 8.77 | 9.65 | 8.61 | 10.17 | 13.19 | 1.134 | 11.50 | 10.98 | 8.05 |
| $R_{10}$ | 91.23 | 90.35 | 91.39 | 89.83 | 86.81 | 88.66 | 88.50 | 89.02 | 91.95 |
| $S_{18}$ | 6.85 | 7.54 | 6.57 | 8.10 | 10.13 | 9.03 | 9.08 | 9.12 | 7.09 |
| $S_{10}$-$S_{18}$ | 1.92 | 2.11 | 2.04 | 2.07 | 3.06 | 2.31 | 2.42 | 1.06 | 0.96 |
| Xylan, percent | 12.2 | 13.6 | 14.3 | 14.3 | 13.9 | 13.4 | 13.4 | 15.5 | 13.6 |
| Mannan, percent | 0.1 | 0.1 | 0.1 | 0.8 | 0.9 | 0.5 | 0.5 | 0.7 | 0.7 |
| Araban, percent | 0.8 | 0.9 | 1.0 | 0 | 0 | 0 | 0 | 0 | 0 |
| Galactan, percent | | | | 0 | 0 | 0 | 0 | 0 | 0 |
| Lignin, solubilized, percent | | | | 1.2 | 0.54 | 0.78 | 0.95 | 0.72 | 0.57 |
| Lignin, insolubilized, percent | | | | 1.1 | 1.5 | 2.1 | 1.8 | 2.6 | 5.3 |
| Ash, percent | 2.58 | | 1.36 | | | | | | |

[1] Derived entirely from Na₂S.

EXAMPLE II

| | Cedar, Greenstg. second growth | | | Cedar, dead old growth | | |
|---|---|---|---|---|---|---|
| Active alkali, percent [1] | 15 | 12 | 9 | 15 | 12 | 9 |
| Liquor to wood ratio, w./w. | 5:1 | 5:1 | 5:1 | 5:1 | 5:1 | 5:1 |
| Percent sulfolane | 50 | 50 | 50 | 50 | 50 | 50 |
| Time to, hours | 1.5 | 1.5 | 1.5 | 1.5 | 1.5 | 1.5 |
| Time at, hours | 2 | 2 | 2 | 2 | 2 | 2 |
| Temperature, °C | 170 | 170 | 170 | 170 | 170 | 170 |
| Yield, percent | 43.4 | 45.4 | 48.3 | 37.0 | 37.0 | 39.6 |
| Tailings, percent | Nil | Nil | 0.47 | Nil | Nil | Nil |
| "K" Number | 21.7 | 26.2 | 33.8 | 18.2 | 20.6 | 25.4 |
| I.V. | 13.96 | 15.72 | 17.10 | 13.40 | 14.70 | 15.10 |
| $S_{10}$ | 7.71 | 6.78 | 5.22 | 6.24 | 5.97 | 5.86 |
| $R_{10}$ | 92.29 | 93.22 | 94.78 | 93.76 | 94.03 | 94.14 |
| $S_{18}$ | 7.1 | 6.64 | 5.55 | 5.80 | 5.53 | 5.34 |
| $S_{10}$-$S_{18}$ | 0.5 | 0.14 | -0.33 | 0.44 | 0.44 | 0.52 |
| Xylan, percent | 6.0 | 6.8 | 6.1 | 3.9 | 4.0 | 3.8 |
| Mannan, percent | 4.1 | 4.2 | 3.8 | 3.3 | 3.3 | 3.0 |
| Araban, percent | 0.6 | 0.7 | 0.7 | 0 | 0 | 0 |
| Galactan, percent | 0.4 | 0.5 | 0.7 | 0.7 | [2] | [2] |
| Lignin, sol., percent | 0.38 | 0.19 | 0.20 | 0.21 | 0.20 | 0 |
| Lignin, insol., percent | 3.6 | 5.1 | 8.1 | 3.3 | 3.8 | 5.7 |

[1] Derived entirely from Na₂S.
[2] Trace.

EXAMPLE III

| | Douglas fir | | |
|---|---|---|---|
| Active alkali, percent [1] | 15 | 12 | 9 |
| Liquor to wood ratio, w./w. | 5:1 | 5:1 | 5:1 |
| Percent sulfolane | 50 | 50 | 50 |
| Time to, hours | 1.5 | 1.5 | 1.5 |
| Time at, hours | 2 | 2 | 2 |
| Temperature, °C | 170 | 170 | 170 |
| Yield, percent | 50.0 | 51.5 | 54.4 |
| Tailings, percent | 0.103 | 0.288 | 0.718 |
| "K" Number | 24.1 | 28.3 | 32.4 |
| I.V. | 14.7 | 16.8 | 17.2 |
| $S_{10}$ | 6.07 | 5.37 | 4.40 |
| $R_{10}$ | 93.93 | 94.63 | 95.60 |
| $S_{18}$ | 4.61 | 4.21 | 3.51 |
| $S_{10}$-$S_{18}$ | 1.46 | 1.16 | 0.89 |
| Xylan, percent | 4.4 | 4.2 | 4.5 |
| Mannan, percent | 6.1 | 5.8 | 6.1 |
| Araban, percent | 0.5 | 0.5 | 0.5 |
| Galactan, percent | 0.8 | 0.8 | 1.1 |
| Lignin, solubilized, percent | 0.238 | 0.14 | 0.17 |
| Lignin, insolubilized, percent | 4.5 | 6.1 | 8.4 |

[1] Derived entirely from Na₂S.

EXAMPLE IV

| | Beech | | | White spruce | | | Red spruce | | |
|---|---|---|---|---|---|---|---|---|---|
| Active alkali, percent [1] | 15 | 12 | 9 | 15 | 12 | 9 | 15 | 12 | 9 |
| Liquor to wood ratio, w./w. | 5:1 | 5:1 | 5:1 | 5:1 | 5:1 | 5:1 | 5:1 | 5:1 | 5:1 |
| Percent sulfolane | 50 | 50 | 50 | 50 | 50 | 50 | 50 | 50 | 50 |
| Time to, hours | 1.5 | 1.5 | 1.5 | 1.5 | 1.5 | 1.5 | 1.5 | 1.5 | 1.5 |
| Time at, hours | 2.5 | 2.5 | 2.5 | 2.5 | 2.5 | 2.5 | 2.5 | 2.5 | 2.5 |
| Temperature, °C | 170 | 170 | 170 | 170 | 170 | 170 | 170 | 170 | 170 |
| Yield, percent | 45.8 | 53.8 | 54.5 | 46.7 | 49.1 | 51.5 | 53.1 | 52.7 | 60.2 |
| Tailings, percent | Nil | Nil | Nil | Nil | Nil | Nil | Nil | Nil | Nil |
| "K" Number | 9.8 | 7.6 | 14.5 | 13.3 | 16.1 | 22.6 | 19.3 | 26.2 | 34.3 |
| I.V. | 13.7 | 16.2 | 16.8 | 13.94 | | 16.7 | 15.9 | 16.3 | 15.7 |

[1] Derived entirely from Na₂S.

EXAMPLE V

Hemlock chips (150 g. O.D.) were cooked at 9% A.A.—derived entirely from Na₂S in sulfolane-water mixture (50% sulfolane, 5:1 liquor to wood ratio) at 170° C. (1.5 hrs. to $T_{max.}$, 2 hrs. at $T_{max.}$) in stainless steel bombs. Liquor was then filtered from the chips and they were defibered (Waring Blendor) in 1% NaOH (2 l.), washed thoroughly with water and collected in a centrifuge. The pulp amounted to a 54.6% yield and had a cuene I.V. of 18.3.

The results follow in Table V.

TABLE V

| | |
|---|---|
| Active alkali, percent [1] | 9 |
| Liquor to wood ratio, w./w. | 5:1 |
| Percent sulfolane | 50 |
| Time to, hrs. | 1.5 |
| Time at, hrs. | 2 |
| Temp. °C. | 170 |
| Yield, percent | 54.6 |
| Tailings | Nil |
| "K" Number | 36.2 |
| Cuene I.V. | 18.3 |
| $S_{10}$ | 3.77 |
| $R_{10}$ | 96.23 |
| $S_{18}$ | 3.50 |
| $S_{10}$-$S_{18}$ | 0.27 |
| Xylan, percent | 4.1 |
| Mannan, percent | 8.2 |
| Araban, percent | 1.0 |
| Galactan, percent | 1.2 |
| Lignin, sol. | 0.19 |
| Lignin, insol. | 9.4 |

[1] Derived entirely from Na₂S.

EXAMPLE VI

A Southern pine wood chip furnish in a solution to wood ratio of 5:1 (50% ethylene glycol), A.A. 9, 12, and 15% provided entirely by Na₂S was digested for 3, 3½ hours at 170° and 180° C. The results are shown in Table VI.

TABLE VI

|  | 1 | 2 | 3 | 4 | 5 | 6 |
|---|---|---|---|---|---|---|
| Active alkali, percent | 15 | 12 | 9 | 15 | 12 | 9 |
| $Na_2S$, grams [1] | 46.05 | 36.82 | 27.62 | 46.05 | 36.82 | 27.62 |
| Time to, hours | 1.5 | 1.5 | 1.5 | 1.5 | 1.5 | 1.5 |
| Time at, hours | 2 | 2 | 2 | 2.5 | 2.5 | 2.5 |
| Temperature, °C | 170 | 170 | 170 | 180 | 180 | 180 |
| Yield, percent | 44.5 | 38.1 | 38.3 | 47.5 | 46.0 | 38.9 |
| Tailings, percent | 6.6 | 16.4 | 21.1 | $4.37 \times 10^{-2}$ | 1.55 | 15.0 |
| "K" Number | 35.8 | 36.4 | 36.3 | 27.1 | 34.9 | 37.2 |
| I.V. | 15.07 | 15.50 | 15.50 | 14.88 | 15.06 | 14.86 |
| $S_{10}$ | 6.68 | 6.05 | 5.15 | 8.09 | 6.99 | 6.95 |
| $R_{10}$ | 93.32 | 93.95 | 94.85 | 91.91 | 93.01 | 93.05 |
| $S_{18}$ | 5.16 | 4.83 | 4.05 | 6.43 | 5.45 | 5.26 |
| $S_{10}-S_{18}$ | 1.52 | 1.22 | 1.10 | 1.66 | 1.54 | 1.69 |
| Xylan, percent | 5.5 | 6.1 | 5.6 | 5.5 | 6.2 | 5.3 |
| Mannan, percent | 4.4 | 4.8 | 4.8 | 4.3 | 4.5 | 4.6 |
| Araban, percent | 0.8 | 1.1 | 1.0 | 1.0 | 0.8 | 1.0 |
| Galactan, percent | 0.5 | 0.5 | 0.6 | 0.4 | 0.9 | 0.6 |
| Lignin, solubilized, percent | 0.32 | 0.16 | 0.2 | 0.26 | 0.73 | 0.42 |
| Lignin, insolubilized, percent | 8.9 | 11.6 | 14.3 | 5.0 | 7.0 | 12.0 |

[1] 61.5% $Na_2S$, with remainder water of crystallization.

EXAMPLE VII

Western hemlock was digested in a solution with a wood ratio of 5:1, A.A. 15% for 3 hours at 170° C.

From the accompanying graph (FIG. 1) it would appear that at higher concentrations sulfolane is quite effective for lignin removal—being less effective at lower concentrations. However, at higher sulfolane concentration, cuene I.V.'s tend to be lower so that a balance between these two values is important. A solution of about 50% sulfolane seems to be near optimum but this ratio could vary slightly to either side of this optimum. The lower cuene I.V.'s brought about by higher sulfolane concentration does not show large variation—only 2.5 units over the whole range. The results are shown in Table VII.

TABLE VII

|  | 1 | 2 | 3 | 4 | 5 | 6 |
|---|---|---|---|---|---|---|
| Active alkali, percent [1] | 15 | 15 | 15 | 15 | 15 | 15 |
| Time to, hours | 1.5 | 1.5 | 1.5 | 1.5 | 1.5 | 1.5 |
| Time at, hours | 1.5 | 1.5 | 1.5 | 1.5 | 1.5 | 1.5 |
| Temperature, °C | 170 | 170 | 170 | 170 | 170 | 170 |
| Yield, percent | 48.6 | 48.0 | 50.1 | 51.1 | 51.1 | 52.9 |
| "K" Number | 23.7 | 25.0 | 25.4 | 27.8 | 30.6 | 31.1 |
| I.V. | 11.2 | 12.0 | 12.7 | 13.8 | 13.3 | 13.7 |
| $S_{10}$ | 7.29 | 7.13 | 6.30 | 6.92 | 6.33 | 5.14 |
| $R_{10}$ | 92.71 | 92.81 | 93.70 | 93.08 | 93.67 | 94.86 |
| $S_{18}$ | 5.54 | 5.28 | 4.51 | 4.19 | 4.43 | 3.77 |
| $S_{10}-S_{18}$ | 1.75 | 1.85 | 1.79 | 2.73 | 1.90 | 1.37 |
| Xylan, percent | 6.4 | 5.6 | 6.6 | 6.1 | 5.9 | 5.5 |
| Mannan, percent | 6.8 | 6.3 | 6.7 | 6.0 | 5.6 | 5.4 |
| Araban, percent | 0.9 | 0.9 | 0.9 | 0.8 | 0.8 | 0.8 |
| Galactan, percent | 0.7 | 0.6 | 0.6 | 0.7 | 0.6 | 0.7 |
| Lignin, solubilized, percent | 3.5 | 3.6 | 4.1 | 5.0 | 6.5 | 7.5 |
| Lignin, insolubilized, percent | 0.36 | 0.48 | 0.36 | 0.21 | 0.12 | 0.08 |
| Tailings, percent | Nil | Nil | Nil | Nil | Nil | Nil |
| Percent sulfolane in liquor (w./w.) | 70 | 63 | 57 | 43 | 36 | 30 |

[1] Derived entirely from $Na_2S$.

EXAMPLE VIII

In this example a western hemlock wood furnish in a solution to wood ratio of 5:1 (50% sulfolane by weight), with an A.A. of 10%, was digested for 1, 1.5 and 2 hours at 170° C. The only alkali added was $Na_2S$.

The wood cooked at 1 and 1.5 hours failed to produce pulp and was discarded. The two hour cook was defibered but was not delignified to the point where it was soluble in cuene. Therefore, no I.V. was available. Compared to other data it would appear that for the above conditions the minimum time needed to produce pulp is on the order of 2.5 hours.

EXAMPLE IX

Western hemlock wood chips in a solution to wood ratio of 5:1 (50% sulfolane by weight), A.A. 9, 12, and 15% provided by $Na_2S$. As seen from the accompanying graph (FIG. 2) increase in temperature leads to lower I.V. It should be noted, however, that experimental points on the graph are extremely limited and the plots are intended to indicate trends only. Yields, "K" number, and lignin values vary inversely with temperature. Generally, the relationships are those to be expected from temperature increase. The results of these tests are also shown in Table IX.

TABLE IX

|  | 1 | 2 | 3 | 4 | 5 | 6 | 7 | 8 | 9 |
|---|---|---|---|---|---|---|---|---|---|
| Active alkali, percent | 15 | 12 | 9 | 15 | 12 | 9 | 12 | 15 | 9 |
| $Na_2S$, grams [1] | 46.05 | 36.82 | 27.62 | 46.05 | 36.82 | 27.62 | 36.82 | 46.05 | 27.62 |
| Time to, hours | 1.5 | 1.5 | 1.5 | 1.5 | 1.5 | 1.5 | 1.5 | 1.5 | 1.5 |
| Time at, hours | 1.5 | 1.5 | 1.5 | 1.5 | 1.5 | 1.5 | 1.5 | 1.5 | 1.5 |
| Temperature, °C | 180 | 180 | 180 | 190 | 190 | 190 | 170 | 170 | 170 |
| Yield, percent | 43.5 | 49.1 | 51.3 | 38.4 | 46.1 | 49.4 | 53.4 | 48.9 | 55.8 |
| Tailings, percent | Nil | Nil | Nil | Nil | Nil | Nil | Nil | Nil | 0.75 |
| "K" Number | 16.4 | 20.7 | 29.4 | 10.5 | 13.7 | 21.2 | 33.5 | 28.9 | 37.0 |
| I.V. | 14.00 | 15.5 | 16.2 | 12.6 | 14.5 | 15.75 | 17.30 | 16.35 | 16.88 |
| $S_{10}$ | 6.91 | 6.04 | 4.60 | 8.28 | 7.20 | 5.84 | 4.20 | 5.16 | 3.55 |
| $R_{10}$ | 93.09 | 93.96 | 95.40 | 91.72 | 92.80 | 94.16 | 95.80 | 94.94 | 96.45 |
| $S_{18}$ | 6.01 | 5.20 | 4.10 | 7.35 | 6.47 | 5.18 | 3.82 | 4.35 | 3.04 |
| $S_{10}-S_{18}$ | 0.90 | 0.84 | 0.50 | 0.93 | 0.73 | 0.66 | 0.38 | 0.71 | 0.51 |
| Xylan, percent | 3.7 | 4.0 | 3.6 | 3.7 | 4.2 | 5.1 | 3.2 | 2.7 | 2.5 |
| Mannan, percent | 6.4 | 6.2 | 6.0 | 6.0 | 6.3 | 8.2 | 6.9 | 5.7 | 4.9 |
| Araban, percent | 0.5 | 0.7 | 0.7 | 0.6 | 0.7 | 0.8 | 0.7 | 0.5 | 0.7 |
| Galactan, percent | 0.6 | 0.8 | 0.9 | 0.7 | 0.6 | 0.7 | 1.0 | 0.5 | 0.5 |
| Lignin, solubilized, percent | 0.27 | 0.27 | 0.27 | 0.38 | 0.31 | 0.32 | 0.26 | 0.27 | 0.34 |
| Lignin, insolubilized, percent | 2.7 | 4.0 | 6.5 | 1.5 | 2.6 | 4.1 | 7.4 | 6.0 | 10.8 |

[1] 61.5% $Na_2S$ with remainder water of crystallization.

EXAMPLE X.—WOOD FURNISH—WESTERN HEMLOCK CHIPS

|  | 1 | 2 | 3 | 4 | 5 | 6 |
|---|---|---|---|---|---|---|
| Active alkali, percent | 15 | 15 | 15 | 15 | 15 | 15 |
| Liquor to wood ratio, w./w | 5:1 | 5:1 | 5:1 | 5:1 | 5:1 | 5:1 |
| Sulfidity, percent | 100 | 100 | 100 | 100 | 100 | 100 |
| Time to, hours | 1.5 | 1.5 | 1.5 | 1.5 | 1.5 | 1.5 |
| Time at, hours | 1.5 | 1.5 | 1.5 | 1.5 | 1.5 | 1.5 |
| Temperature, °C | 170 | 170 | 170 | 170 | 170 | 170 |
| Yield, percent | 48.6 | 48.0 | 50.1 | 51.1 | 51.1 | 52.9 |
| "K" Number | 23.7 | 25.0 | 25.4 | 27.8 | 30.6 | 31.1 |
| I.V | 11.2 | 12.0 | 12.7 | 13.8 | 13.3 | 13.7 |
| $S_{10}$ | 7.29 | 7.13 | 6.30 | 6.92 | 6.33 | 5.14 |
| $R_{10}$ | 92.71 | 92.81 | 93.70 | 93.08 | 93.67 | 94.86 |
| $S_{18}$ | 5.54 | 5.28 | 4.51 | 4.19 | 4.43 | 3.77 |
| $S_{10}$-$S_{18}$ | 1.75 | 1.85 | 1.79 | 2.73 | 1.90 | 1.37 |
| Xylan, percent | 6.4 | 5.6 | 6.6 | 6.1 | 5.9 | 5.5 |
| Mannan, percent | 6.8 | 6.3 | 6.7 | 6.0 | 5.6 | 5.4 |
| Araban, percent | 0.9 | 0.9 | 0.9 | 0.8 | 0.8 | 0.8 |
| Galactan, percent | 0.7 | 0.6 | 0.6 | 0.7 | 0.6 | 0.7 |
| Lignin, solubilized, percent | 3.5 | 3.6 | 4.1 | 5.0 | 6.5 | 7.5 |
| Lignin, insolubilized, percent | 0.36 | 0.48 | 0.36 | 0.21 | 0.12 | 0.08 |
| Tailings, percent | Nil | Nil | Nil | Nil | Nil | Nil |
| Percent sulfolane in liquor (w./w.) | 70 | 63 | 57 | 43 | 36 | 30 |

NOTE: The effect of the variation in sulfolane to water ratio (w./w.) is graphically illustrated in FIG. 1.

We claim:
1. In the pulping of wood chips in aqueous alkaline solutions in which the entire active alkali is essentially sodium sulfide, the improvement which comprises digesting the wood chips in such aqueous alkaline solution in combination with an organic solvent for lignin at a temperature of from about 160° C.–190° C. for a period of from about 2.5–4 hours to produce a pulp having cuene I.V. values varying from 10 to 18 and being soluble in cuene after chloriting, said solvent being selected from the group consisting of alkyl polyols, cyclic sulfones, acylic sulfones, and mixtures thereof and the amount of solvent in the combination varying from about 30 to 70 percent.

2. In the process of claim 1 the aqueous solution containing from 9 to 15% active alkali added as sodium sulfide and the organic solvent is a sulfone.

3. The pulping process of claim 2 in which the digestion solution to wood chip ratio is 5:1, the sulfone to water ratio is 1:1 by weight, the digestion temperature is about 170° C. and the digestion time is about 3.5 hours.

4. The pulping process of claim 2 in which the digestion solution to wood chip ratio is 5:1, the organic solvent is sulfolane and the sulfolane to water ratio is 1:1 by weight, the digestion temperature is about 170° C. and the digestion time is about 3.5 hours.

5. The pulping process of claim 1 in which the organic solvent is at least one of the compounds: ethylene glycol, sulfolane, dimethyl sulfone, di-n-propyl sulfone, di-n-butyl sulfone or 3-methyl sulfolane.

6. A wood pulp produced by the process of claim 1.

References Cited

UNITED STATES PATENTS 2,022,654  12/1935  Dreyfus _____ 162—76 X
2,192,202  3/1940  Peterson _____ 162—72 X HOWARD R. CAINE, Primary Examiner U.S. Cl. X.R.

162—77

PO-1050
(5/69)

UNITED STATES PATENT OFFICE
CERTIFICATE OF CORRECTION

Patent No. 3,513,068        Dated May 19, 1970

Inventor(s) LAURENCE D. STARR and RONALD L. CASEBIER

It is certified that error appears in the above-identified patent and that said Letters Patent are hereby corrected as shown below:

Column 1, line 18, "eyceptionally" should be --exceptionally--

Column 1, line 50, "lign" should be --lignin--

Column 2, line 18, "hemicullulose" should be --hemicellulose--

Column 2, line 42, "derived" should be --desired--

Column 2, line 49, "standards" should be --standard--

Column 2, line 60 "M" should be --M--

Column 3-4, Example I, Table, 6th numbered column, 10th number down "1.134" should be --11.34--

SIGNED AND
SEALED
SEP 15 1970

(SEAL)
Attest:

Edward M. Fletcher, Jr.
Attesting Officer

WILLIAM E. SCHUYLER, JR.
Commissioner of Patents